(12) United States Patent
Choo

(10) Patent No.: US 7,105,090 B2
(45) Date of Patent: Sep. 12, 2006

(54) BACKFLUSHING FILTER

(76) Inventor: Kim Poh Choo, BLK 558, #06-445, Jurong West ST 42, Singapore (SG) 640 558

( * ) Notice: Subject to any disclaimer, the term of this patent is extended or adjusted under 35 U.S.C. 154(b) by 505 days.

(21) Appl. No.: 10/726,012

(22) Filed: Dec. 1, 2003

(65) Prior Publication Data
US 2005/0115886 A1    Jun. 2, 2005

(51) Int. Cl.
*B01D 35/12* (2006.01)
(52) U.S. Cl. .................... 210/333.1; 210/426; 210/427
(58) Field of Classification Search ............ 210/333.1, 210/108, 426, 425, 411, 427
See application file for complete search history.

(56) References Cited

U.S. PATENT DOCUMENTS

| | | | | |
|---|---|---|---|---|
| 2,077,589 A | * | 4/1937 | Seaver et al. ............... | 210/330 |
| 3,734,299 A | * | 5/1973 | Akiyama .................. | 210/333.1 |
| 5,030,347 A | * | 7/1991 | Drori ......................... | 210/331 |
| 5,383,491 A | * | 1/1995 | Heilman ..................... | 137/597 |
| 5,779,898 A | * | 7/1998 | Schwanekamp et al. .... | 210/324 |
| 5,830,347 A | * | 11/1998 | Vollmer ....................... | 210/107 |
| 5,855,794 A | * | 1/1999 | Caracciolo, Jr. ............ | 210/739 |
| 6,139,727 A | * | 10/2000 | Lockwood .................. | 210/107 |

\* cited by examiner

*Primary Examiner*—Terry K. Cecil
(74) *Attorney, Agent, or Firm*—Townsend and Townsend and Crew LLP

(57) ABSTRACT

A filter has three filter elements, e.g., screens, for trapping particulate material while allowing passage of a fluid. The second sides of each of the first and second screens are connected to an intermediate passage, and the second side of the third screen, and the intermediate passage, are connected to a filter outlet port. The filter has two alternately selectable configurations. In a first configuration, the first side of the first screen is connected to a filter inlet port, and the first side of the second screen is connected to the first side of the third screen. In the second configuration the first side of the second screen is connected to the inlet port, and the first side of the first screen is connected to the first side of the third screen. The first and second screens alternately filter particulates which are subsequently flushed and then trapped by the third screen for periodic removal.

11 Claims, 11 Drawing Sheets

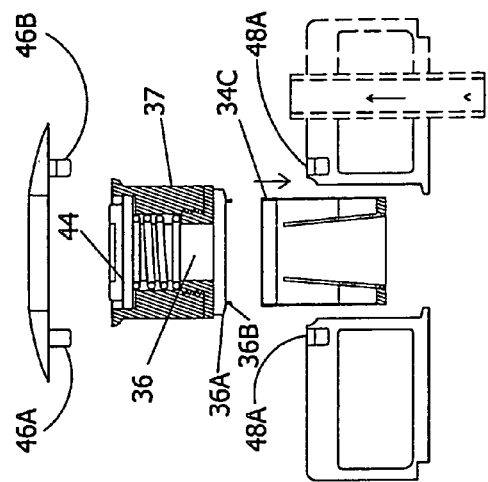
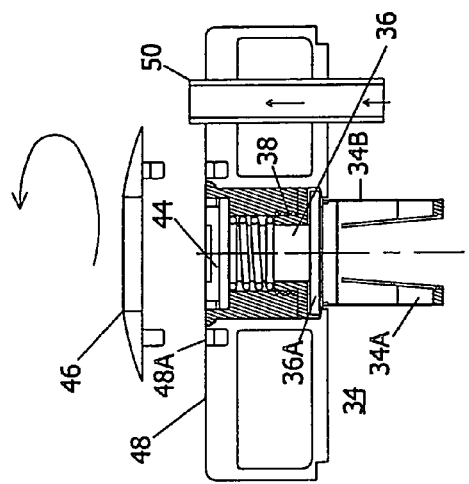
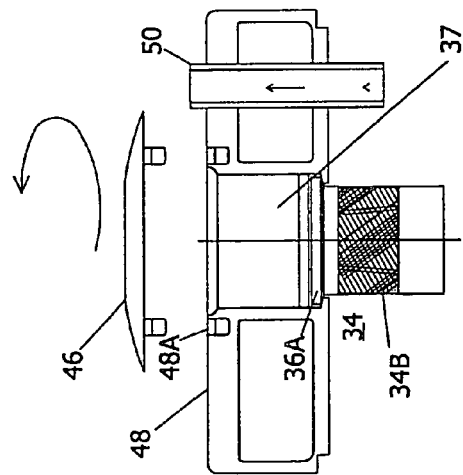
FIG. 5C
FIG. 5B
FIG. 5A

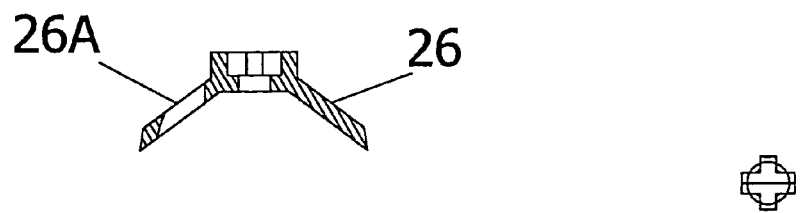
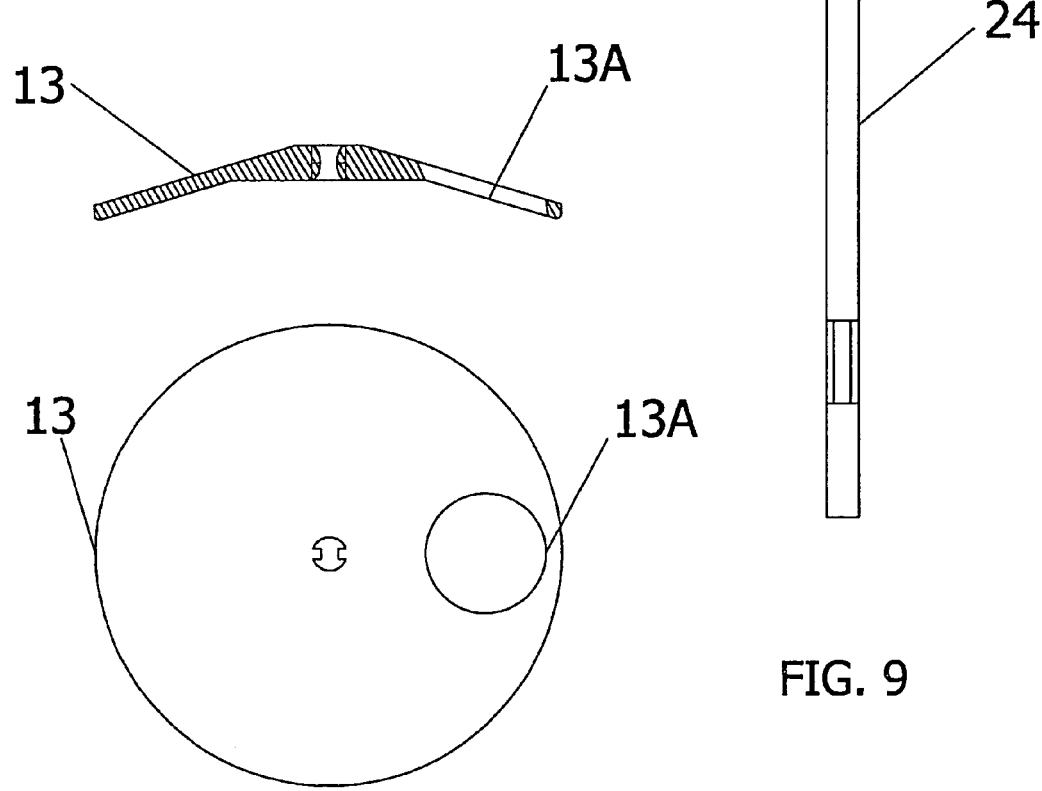
FIG. 8
FIG. 7
FIG. 9

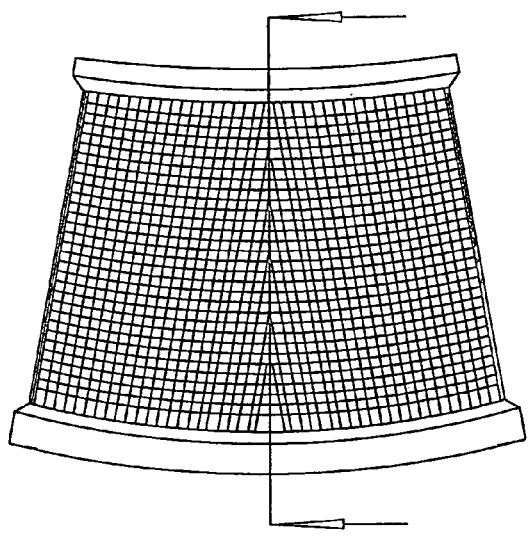
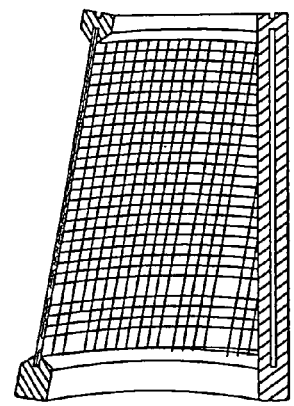
FIG. 10A    FIG. 10B
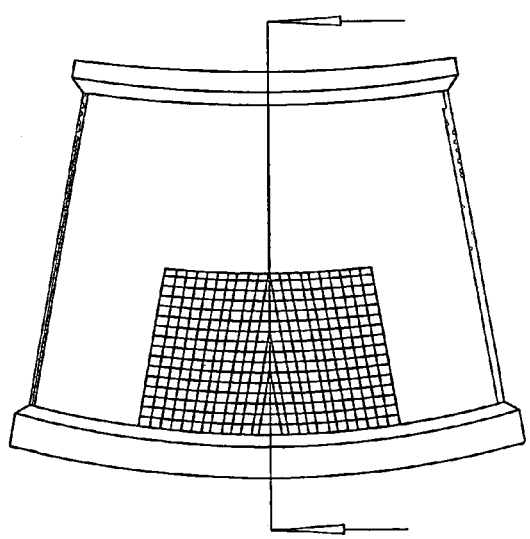
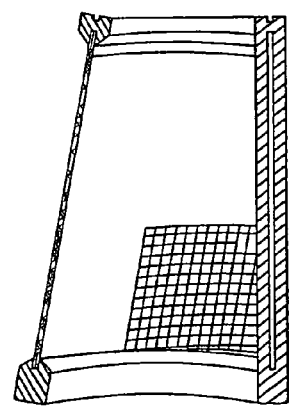
FIG. 11A    FIG. 11B

BACKFLUSHING FILTER

FIELD OF INVENTION

The present invention relates to filters for removing or straining solids from fluids. The present invention relates particularly to so-called 'backflushing filters' in which a filter element that is used to trap solids is cleaned by fluid flowing through the filter element in a direction opposite to the flow of fluid when being filtered. The reverse or backflushing flow cleans the filter element by removing trapped solids.

BACKGROUND

Filters are commonly used to remove solid material from a fluid by passing the fluid through a filter element. The filter element, which is typically a mesh or screen, or a porous material such as a solid foam block, wool, plastics, or the like, entraps solid materials that are insufficiently small to pass through passages in the filter element.

In one representative application, contaminated water from an aquarium is circulated through a filter to remove solids suspended or floating in the water. In aquaria, waste material can be converted by heterotrophic bacteria to ammonia which is extremely toxic to fish. Ammonia produced from an accumulation of waste can result in casualties to aquaria stock.

While present filters strain and remove solids from the re-circulated water. Known aquarium filters suffer from a number of disadvantages.

The filter element or media, particularly if made from polymer plastics, e.g., in the form of a sponge or floss, does not readily break down and can therefore be an environmental hazard when disposed.

Periodic maintenance is required to remove and clean the filter media. This can require a considerable amount of time and water to clean and 'unplug' particles trapped in the media.

Filtration efficiency depends upon the flow rate and volume passing through the surface area of the filter element or media. In general, a larger filter area will clog more slowly than a smaller filter area. However, as the filter media becomes more clogged, it begins to trap finer particles and gradually the filtering efficiency drops. Eventually, the filter becomes so clogged that it passes little or no water.

To eliminate, or at least delay the effects of clogging, the effective area of the filter element, and the pump used to circulate water through the filter, can be upsized. However, this upsizing involves additional expense.

During an initial phase of using a filter element, when the passages through the filter are relatively open and unclogged, large particles of uneaten food or fish excreta can become trapped in the filter. Such particles can decompose before the filter element matures or is cleaned. Products resulting from this decomposition can endanger the health of the fish and can cause casualties. Although this situation can be remedied, typically by changing the aquarium water, this is time consuming and inconvenient.

Filters that use a flushing flow to clean filter elements by removing clogged particles trapped by the filter element are known.

U.S. Pat. No. 5,030,347 describes a water filter in which a valve is opened to cause water to flow across a filter element to dislodge and flush dirt away from the filter element. However, there is no backflush or reversal of flow through the filter element and during flushing of the filter element, the normal outflow is interrupted.

U.S. Pat. No. 5,383,491 describes a flow diversion arrangement for a twin tank filter system. In a backwash mode, water comes in through a main inlet and is sent to an in-service filter tank in a normal flow direction. This flow, after filtering by the tank filter, leaves that tank and a regulated portion of flow returns to a second tank (that being backwashed) in a direction opposite the normal flow direction. The reverse flow cleans out the second filter tank and dirt, etc. flows out the tank inlet passage and exits through the backwash passage. The back wash outlet does not connect to the normal flow destination. It may be connected to another container for removal of dirt, or may simply be drained away.

U.S. Pat. No. 5,779,898 describes a filter device having a fluid supply duct which is connected with a fluid removal duct by at least two partial fluid ducts. A filtering element, a valve blocking element, and a stop valve are each located in each of the two partial fluid ducts. Each blocking element can be moved between a first (open) position, in which the fluid flowing through the partial fluid duct in which it is located is filtered, and a second (closed) position, in which the fluid is filtered in the other partial fluid duct, whereas at the same time the filtering element provided in the partial fluid duct in which it is located is washed by the fluid flowing in the reverse direction. Furthermore, each blocking element can be brought from the first position into the second position and vice versa by rotating the blocking element. The flushing fluid flowing in the reverse direction and carrying particulate matter flushed from the filtering element, is drained away externally of the device to the atmosphere.

U.S. Pat. No. 5,830,347 describes a backflushing water filter with a cylindrical element through which fluid being filtered flows radially inward. This flow direction is reversed during a flushing cycle. It is said that the filter can be periodically cleaned without interrupting the flow of filtered fluid to a user. However, a reduced output flow rate or pressure may occur because some of the fluid is flushed back through the filter element to a drain.

U.S. Pat. No. 5,855,794 describes a filter. During a normal flow phase, fluid to be filtered, e.g. water contaminated with solids, is passed from an inlet port, through a filter element, and to an outlet port. During a cleansing phase, the normal inlet and outlet ports are closed and flushing inlet and outlet ports are opened to cause a flushing fluid to flow through the filter element in a reverse direction to the normal flow. A pair of such filters may be arranged in parallel so that the normal fluid flow occurs in one filter while the other is being flushed with the reverse flow. A reversal of these roles occurs periodically, e.g. when the pressure differential across the in-service filter is indicative of a degree of contamination of the in-service filter. A separate supply of clean flushing fluid is required and the contamination removed from the filter element is entrained in the flushing fluid which is drained away.

U.S. Pat. No. 6,139,727 describes a self-cleaning backflushing water filter for filtering particulate from a fluid flow stream such as water. A segmented filter element is backwashed or flushed clean in response to a cyclic on-off supply of the fluid. The filter has a housing with inlet and outlet fittings for in-line connection along a water supply conduit, down stream of an on-off valve. The segmented filter element is supported within the filter housing, with a first filter segment aligned with an inlet port for filtering water. When the water supply is turned on, filtered water passing through the first filter segment initially backwashes through a second filter segment with increasing line pressure to flush prior-collected particulate thereon through a flush port. When the line pressure reaches a predetermined level, a normally open and pressure responsive flush valve closes the flush port. Thereafter, with further increased line pressure, a pressure responsive outlet valve opens an outlet port to permit flow of filtered water through an outlet fitting in the housing. When the water supply is turned off, a pressure responsive index mechanism rotates the filter element for reversing the positions of the first and second filter segments relative to the inlet and flush ports, so that water is filtered by the second filter segment and particulate is flushed from the first filter segment when the water supply is next turned on. The flushing fluid, with entrained flushed particulates, is flushed from the flushing port, and is therefore lost from the flow which issues as the filtered flow at the outlet.

SUMMARY OF INVENTION

One embodiment of the present invention provides a filter which goes at least part way to reducing some of the problems of the prior art filters, or at least provides the public with a useful choice.

Another embodiment of the present invention provides a back-flushing filter in which particulates are collected in an easily removable filter cartridge.

One embodiment of the invention continues a filter device for filtering a fluid flow, the filter device having a filter chamber having an inlet port for connection to a source of fluid to be filtered and an outlet port for delivery of fluid filtered by the device, the chamber housing first, second and third filter elements each for trapping particulate material while allowing passage of fluid between first and second opposite sides, wherein the second sides of each of the first and second filter elements are connected to an intermediate passage, the second side of the third filter element and the intermediate passage are connected to the outlet port, the filter device has two alternately selectable configurations, and in a first of the configurations the first side of the first filter element is connected to the inlet port and the first side of the second filter element is connected to the first side of the third filter element, and in a second of the configurations the first side of the second filter element is connected to the inlet port and the first side of the first filter element is connected to the first side of the third filter element.

When the device is in the first configuration, fluid from a source connected to the inlet port flows from the inlet port to the first side of the first filter element, through the first filter element to the second side of the first filter element, to the intermediate passage, to split into first and second parallel partial flows, to flow from the intermediate passage via the first partial flow to the outlet port and via the second partial flow to the second side of the second filter element, through the second filter element to the first side of the second filter element, to the first side of the third filter element, through the third filter element to the second side of the third filter element, and to the outlet port, and when the device is in the second configuration fluid from a source connected to the inlet port flows from the inlet port to the first side of the second filter element, through the second filter element to the second side of the second filter element, to the intermediate passage, to split into third and fourth parallel partial flows, to flow from the intermediate passage via the third partial flow to the outlet port and via the fourth partial flow to the second side of the first filter element, through the first filter element to the first side of the first filter element, to the first side of the third filter element, through the third filter element to the second side of the third filter element, and to the outlet port.

In one embodiment, the intermediate passage can include a fourth filter element, and the partial flows pass through the fourth filter element.

In another embodiment, the fourth filter element has a substantially annular flow passage through which the second and fourth partial flows of fluid move.

The fourth filter element may include a porous media for filtering fluid flowing through the fourth filter element.

The filter device may include an outlet filter element for treating fluid received from the intermediate passage and the second side of: the third filter element prior to being delivered at the outlet port.

In one embodiment, the outlet filter is a basket containing activated carbon or a chemical resin.

In yet another embodiment, the first filter element has a first port and a second port by which the first side of the first filter element is respectively connectable to the inlet port and to the first side of the third filter element, and the second filter element has third port and a fourth port by which the first side of the second filter element is respectively connectable to the inlet port and to the first side of the third filter element; the first and fourth ports being mutually opened and closed, and the second and third ports being mutually opened and closed synchronously but oppositely to the first and fourth ports, the first and fourth ports being open and the second and third ports being closed when the filter device is in the first configuration, and the first and fourth ports being closed and the second and third ports being opened when the filter device is in the second configuration.

In another embodiment, the filter device can include a first disc having a first aperture and a second disc having a second aperture, each of the first and second discs being attached to a common shaft by which the first and second discs can be simultaneously rotated to selectively and alternately align the first aperture with the first and third ports, and the second aperture with the second and fourth ports.

Further, the filter chamber can have a closeable opening through which the third filter element may be removed and replaced.

The invention may further be said to consist in any alternative combination of parts or features mentioned herein or shown in the accompanying drawings. Known equivalents of these parts or features which are not expressly set out are nevertheless deemed to be included.

BRIEF DESCRIPTION OF DRAWINGS

It will be appreciated that a filter may be implemented in various forms. Preferred embodiments of the invention will now be described, by way of example only and without intending to be limiting, with reference to the accompanying drawings of which:

FIGS. 5A, 5B and 5C show part of the filter of FIGS. 1 to 4, with a replaceable cartridge in various stages of removal, FIG. 7 shows a cross-sectional side view and a plan view of a lower port control disc of the filter of FIGS. 1 to 4, FIG. 8 shows a cross-sectional side view and a plan view of an upper port control disc of the filter of FIGS. 1 to 4, FIG. 9 shows an axial end view and a side view of a shaft for carrying the control discs of FIGS. 7 and 8, FIG. 10A is a perspective view of a filter screen of the filter of FIGS. 1 to 4, FIG. 10B is a vertically cross-sectioned view of the screen, as seen at line 1—1 of FIG. 10A, FIG. 11A is a perspective view of an alternative filter screen for the filter of FIGS. 1 to 4, FIG. 11B is a vertically cross-sectioned view of the screen, as seen at line 2—2 of FIG. 11A.

DETAILED DESCRIPTION OF THE PREFERRED EMBODIMENT

In the following description, various features are referred to by orientation or direction; for example, by terms such as vertical, horizontal, lower, upper, underside, above, below, upward and down. These and similar references are given to aid in the understanding of the preferred embodiment when in the orientation shown in FIGS. 1 to 11. Although it may be best, or at least convenient, to use the invention in this orientation, the invention is not limited to the particular orientation as discussed and shown in the figures.

Figure 1:
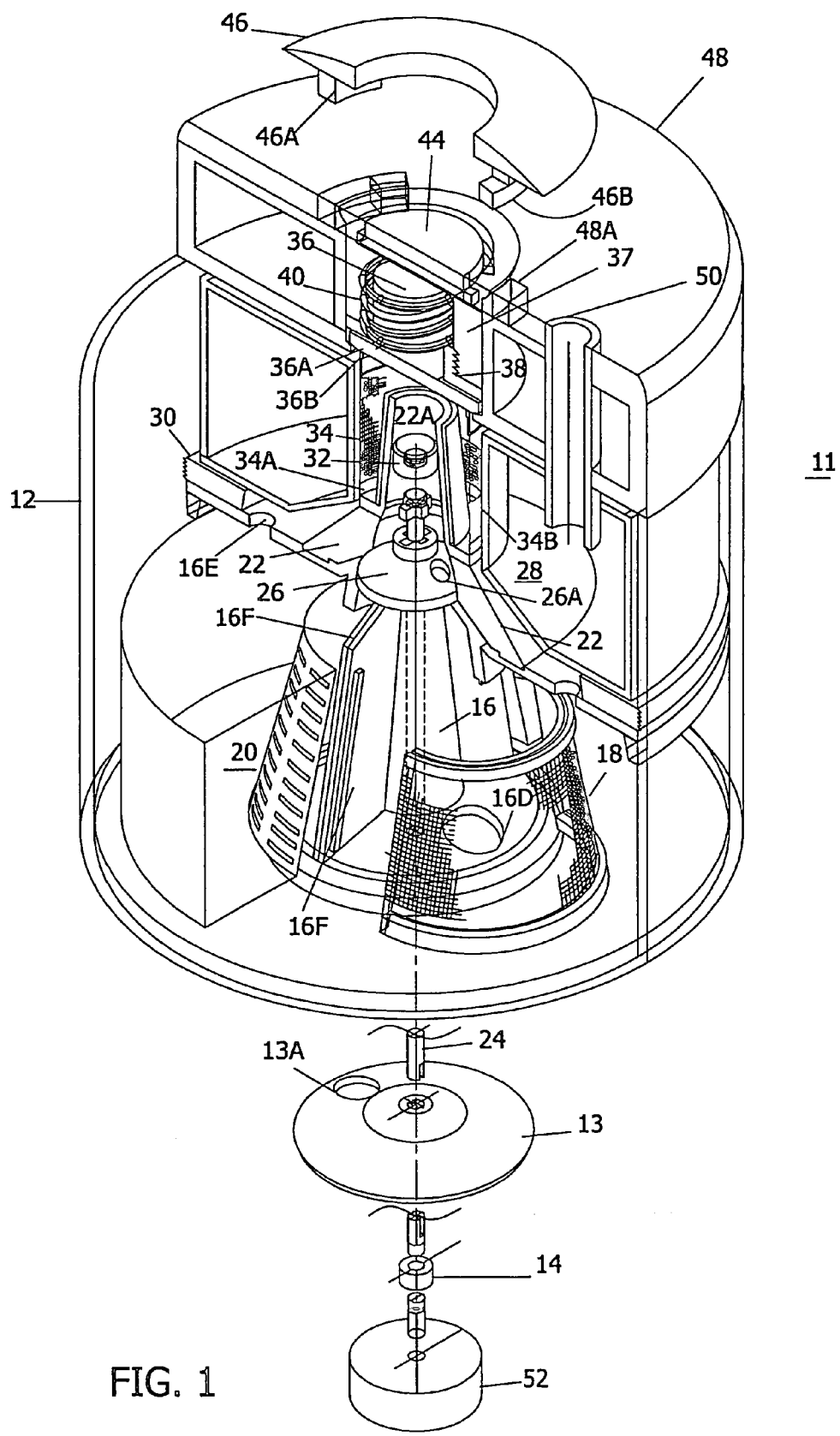
FIG. 1 shows a partly sectioned isometric view of a preferred embodiment of a filter according to the current invention.
Figure 2:
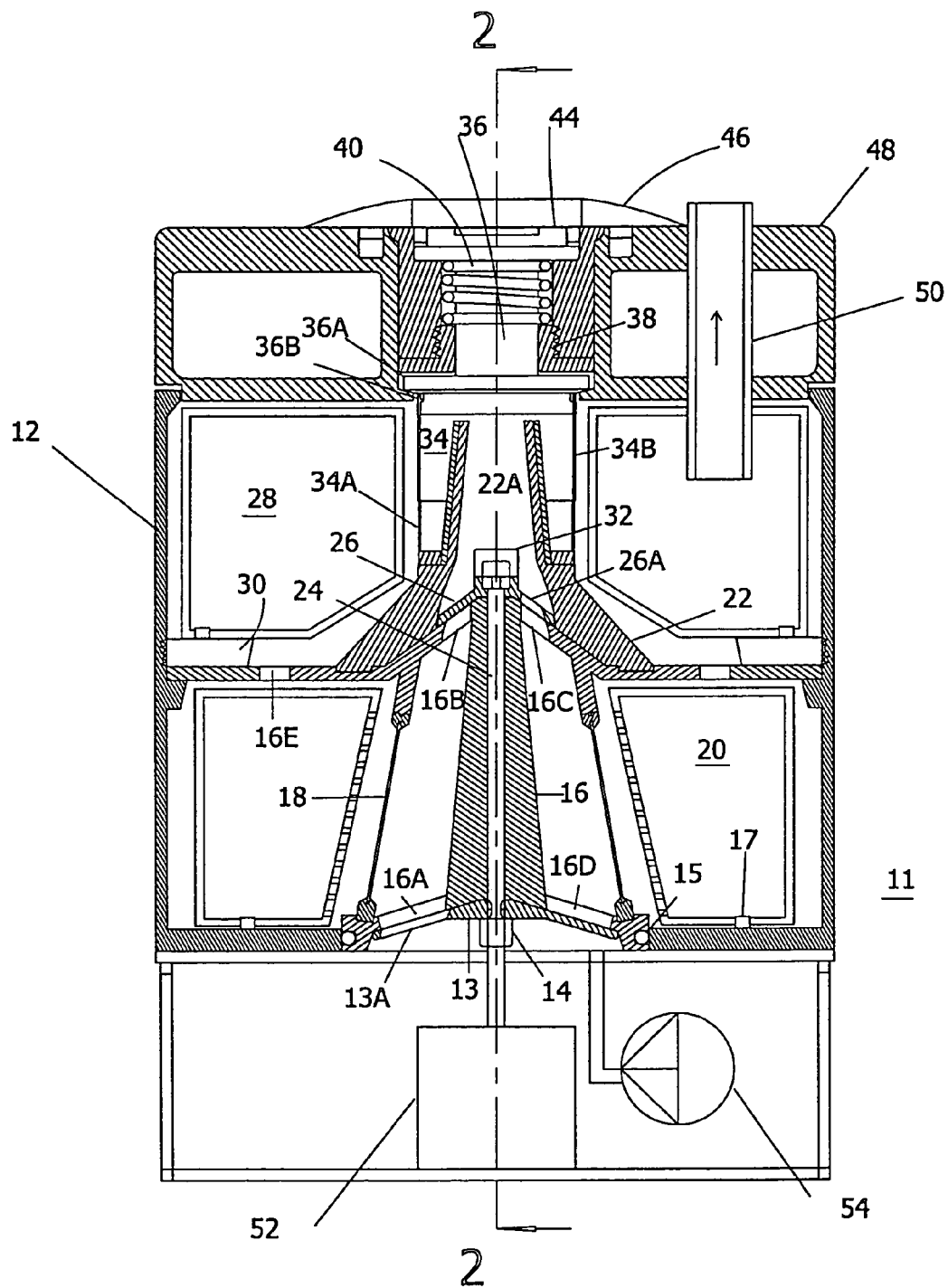
FIG. 2 shows a vertically cross-sectioned elevation of the filter of FIG. 1, as seen at line 1—1 of FIG. 3.
Figure 3:
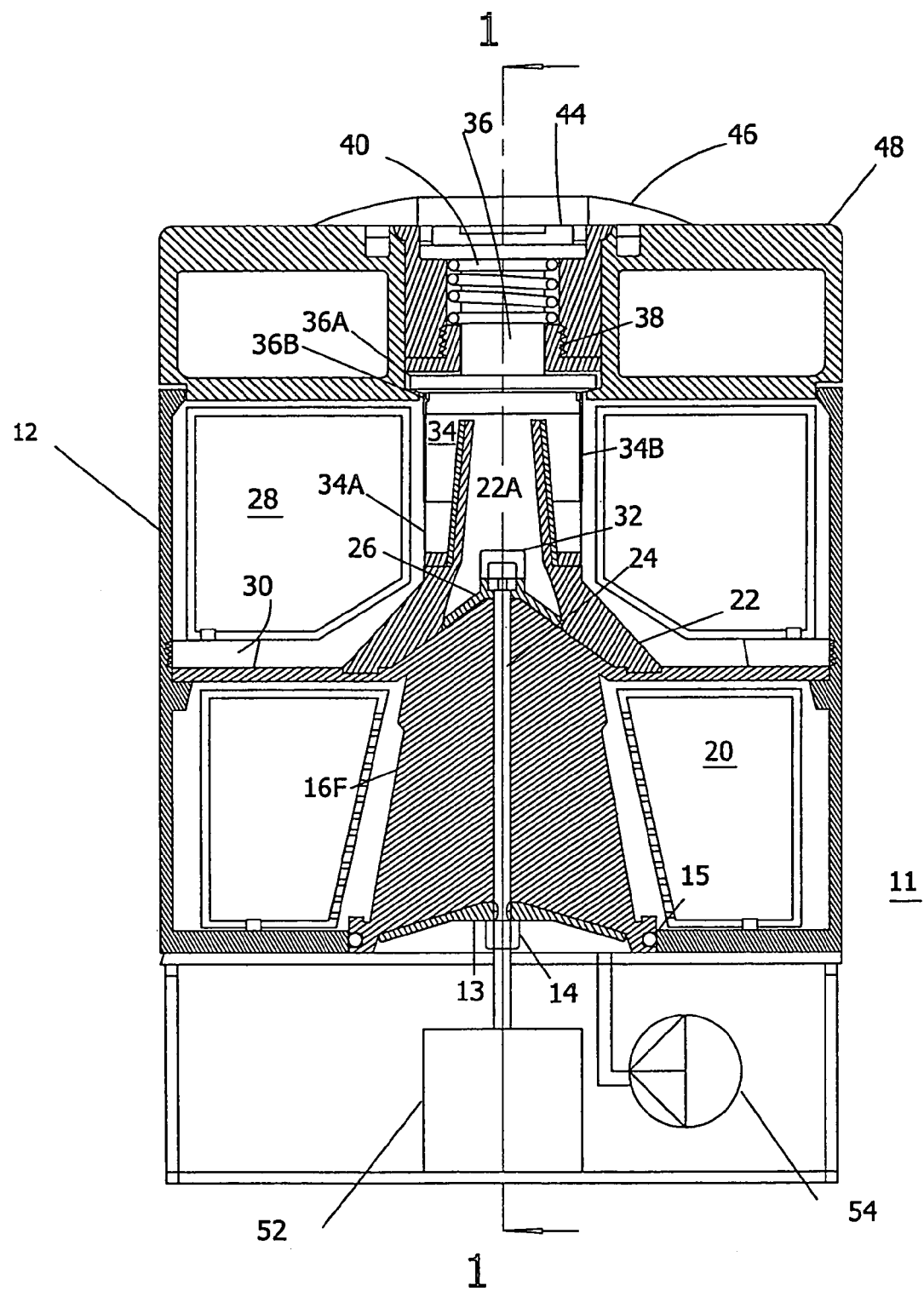
FIG. 3 shows a vertically cross-sectioned elevation of the filter of FIGS. 1 and 2, as seen at line 2—2 of FIG. 2.

FIGS. 1 to 3 show an aquarium water filter 11 having a hollow cylindrical filter housing 12 in the form of a canister. A central filter unit 16 is located in the filter housing. The central filter unit 16 is preferably transparent to allow the internal elements to be visible. The central filter unit 16 has a pair of side-by-side filter chambers separated by a vertical and diametrical parietal 16F. The parietal has two substantially flat side wings which extend from a thickened central portion. A shaft 24 is located in a bore in the central portion, as will be explained further below.

A horizontal planar annular wall extends radially outward from a ported conical wall at the upper axial end of the filter unit 16 to form a mid-height partition that divides the cylindrical filter housing 12 into upper and lower sub-chambers. The planar annular wall rests on an annular ledge on the internal wall of the cylindrical filter housing to locate the central filter unit in the filter housing. An externally threaded locking ring 30 holds the central filter unit 16 securely in position, with the annular planar wall against the annular ledge.

The lower axial end of the central filter unit 16 has a conical end wall which is located in a central aperture in the floor of the cylindrical filter housing 12. An O-ring 15, fitted about the periphery of the lower axial end wall of the central filter unit 16, seals the filter unit in the floor of the filter housing 12.

A mesh screen 18, which is also shown in FIGS. 10A. and 10B, includes two tapered semi-cylindrical half screens which are mounted on opposite sides of the parietal 16F to define left and right side chambers of the central filter unit 16. The half screens have a mesh held taut over a peripheral frame which supports and stiffens the mesh.

The frame of each half screen has semi-circular upper and lower frame members which are joined by two straight frame members. The upper semi-circular frame member has a groove which engages with a ridge at the lower end of a projection which extends downward from the underside of the ported conical wall at the upper axial end of the filter unit. The lower semi-circular frame member locates in a groove on the topside of the conical end wall at the lower axial end of the central filter unit 16, slightly above and inboard of the O-ring 15. The straight frame members are grooved to dovetail with correspondingly shaped ridges on the outer edges of the parietal 16F, as may be best appreciated from FIG. 1 which shows the right side half of screen 18 displaced to reveal the right face of the parietal 16F.

An alternative mesh screen which is shown in FIGS. 11A and 11B has half screens each with a reduced area of mesh surrounded by solid walls.

The left and right side chambers of the filter unit 16 have respective diametrically opposed inlet ports 16A and 16D in the lower axial end wall of the filter unit, and respective diametrically opposed outlet ports 16B, 16C in the upper conical wall of the central filter unit.

A lower port control disc 13 has a conical shape which abuts intimately against the underside of the lower conical end wall, in a central recess under the filter unit 16. An upper port control disc 26 has a conical shape which abuts intimately against the upper conical wall of the filter unit. The upper and lower port control discs are attached to a common shaft 24 which is located in an axial bore of the filter unit 16.

As may be best appreciated from FIG. 7 (showing conical port control disc 13), FIG. 8 (showing conical port control disc 26), and FIG. 9 (showing common shaft 24), the port control discs 13, 26 have central bosses with apertures that are shaped to be engaged by correspondingly shaped splines on the shaft 24. The boss of the upper disc 26 has a through hole and a pair of crossed grooves which engage a cross-shaped spline at the upper end of the shaft. The lower end of the shaft 24 has key ways on opposite sides of the shaft which engage a correspondingly shaped hole in the lower disc 13.

The two port control discs 13, 26 are rotated simultaneously by rotation of the common shaft 24. The shaft is driven by a drive motor 52 which is attached to the lower end of the shaft and housed below the cylindrical filter housing 12. The shaft 24 is fitted with a threaded locking ring or nut 32 above the upper port control disc 26, and a lock bush 14 below the lower port control disc 13 to retain the discs in place on the shaft. Tightening of the locking nut 32 on the threaded upper end of the shaft 24 brings the upper and lower conical port control discs 13, 26 into respective intimate abutment with the upper and lower conical end walls of the central filter unit 16.

The upper and lower port control discs 13, 26 have respective port control apertures 13A and 26A. As may be appreciated from FIGS. 1 and 2, the apertures 13A and 26A are diametrically opposed so that by rotation of the shaft through sequential intervals of 180 degrees, the two port control discs may be simultaneously rotated so that aperture 13A is brought into alternate alignment with inlet ports 16A and 16D, and aperture 26A is simultaneously brought into alternate alignment with outlet ports 16C and 16B.

An annular lower filter basket 20 is located in the lower sub-chamber of the filter housing, in the annular space surrounding the outer mesh screen 18 of the filter unit 16, under the radial extension of the upper end of the central filter unit 16. The inner face of the lower basket 20 is spaced from the outer surface of the filter screen 18 by a distance of about 10 to 20 mm. A passage 16E connects this annular space with an annular space in the upper sub-chamber of the filter housing. An upper annular basket 28 is located in this annular space in the upper sub-chamber.

The lower basket has a multitude of holes in its interior wall to allow filtered water issuing from the screen to circulate and flow into the basket cavity. The basket contains porous media, for example gravel for biological filtration.

Guiding pins 17 (FIG. 2) in the floor of the filter housing locate in corresponding apertures in the base of the annular lower basket 20 to retain the basket in position. Similarly, guiding pins in the locking ring 30 locate in corresponding apertures in the base of the upper basket 28.

The upper annular basket 28 has an internal cavity which is connected to a filter outlet 50 from which filtered fluid is delivered through an upper lid 48 of the cylindrical filter housing 12. The upper basket contains one or more substances, for example activated carbon, chemical or ion exchange resins, that absorb chemicals that are harmful to fish and other aquaria life.

A removable collector cartridge assembly 34 is surrounded by the upper annular basket 28. As will be explained further below, the assembly collects particulate material that is flushed from the filter screen 18. The collector cartridge assembly 34 has an annular hollow collecting cup 34A which supports, and is lined by, a cartridge mesh 34B. A central venturi passage 22A leads upward from the aperture 26A in the upper conical port control disc 26, axially through the centre of the hollow cup 34A. The hollow cup 34A is supported on a protruding annular base 22 which is disposed in an annular recess in the upper surface of the planar extension of the central filter unit 16. A screw, not shown, or any other suitable fastener or fastening system, may be used to reinforce and hold together the protruding base and the planar extension of the central filter unit 16. The venturi passage gradually tapers from a. broad inlet at its lower end to a narrower outlet at its upper end. The entire length of the venturi passage is disposed within the collector cartridge assembly 34.

The collector cartridge assembly 34 is supported by coupling it to a pusher-holder subassembly 36. The subassembly 36 includes a pusher-holder body 37, an annular locking nut 38, a compression spring 40, and a release knob 44. The annular locking ring is screwed into a threaded bore of the pusher-holder body 37.

The hollow cup 34A of the collector cartridge assembly 34 has an upper cylindrical rim. The internal surface of this cylindrical rim has an annular groove 34C. As may be best appreciated from FIG. 6, and particularly the enlarged detail, the collector cartridge assembly is mated to the pusher-holder assembly 36 by engagement, in. the groove 34C, of a rim 36B which protrudes from the underside of a chamfered disc 36A at the bottom of the annular lock nut 38 of the pusher-holder assembly 36.

The collector cartridge assembly 34 is located in a central axial aperture of an upper lid 48 of the cylindrical filter housing 12. An annular locking ring 46 with diametrically opposed latching fingers 46A, 46B, retains the pusher-holder assembly 36 with the attached collector cartridge assembly 34 in the central aperture of the lid, by engagement of the fingers 46A, 46B with respective keyways 48A in the lid 48, as may be best appreciated from FIGS. 1, 5A, 5B, 5C and 6.

The lower outer circumferential edge of the chamfered disc 36A has a chamfer surface which seals against a correspondingly chamfered annular surface at the lower end of the central axial aperture of the lid 48. A second seal is provided by an annular extension at the upper end of the pusher-holder body 37 which seals against a correspondingly chamfered annular surface at the upper end of the central axial aperture of the lid 48. These two pairs of sealing surfaces are respectively maintained in close contact by compression of the spring 40 against annular lock nut 38, under retention of the annular locking ring 46 and the release knob 44.

Figure 6:
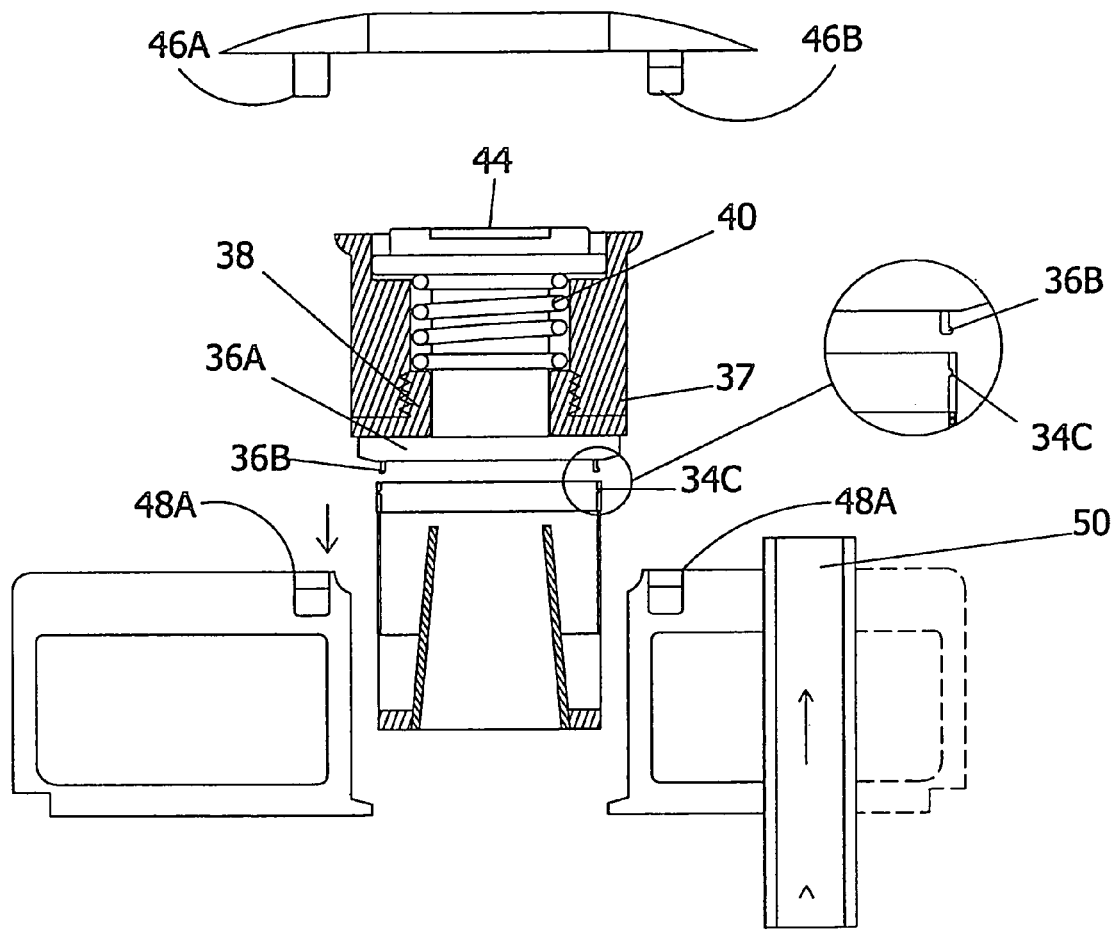
FIG. 6 shows further details, partly further enlarged, of the replaceable cartridge of the filter of FIGS. 1 to 4.

Although seen in FIGS. 1 to 4, the collector assembly 34 may be best appreciated from FIGS. 5A, B and C which show the assembly in various stages of removal from the filter, and from FIG. 6 which shows the assembly in detail.

A circulation pump 54 feeds water to be filtered into the filter 11 at a central recessed area at the bottom of the filter housing 12.

The filter 11 has two alternate configurations which are selected by rotation of the port control discs 13 and 26. FIGS. 1, 2 and 4B show the filter 11 in a first configuration in which port 13A in lower port control disc 13 is in alignment with port 16A; ports 16B and 16D are closed; and port 26A in the upper port control disc 26 is in alignment with port 16C.

In this first configuration fluid is fed to the filter by a pump 54 which introduces fluid through aperture 13A and port 16A, to the left half chamber seen at the left half of the central filter unit 16.

Particulate material is trapped on the inside of the left half of screen 18 at the left side half chamber as fluid flows from the inside to the outside of the filter screen. The filtered fluid then circulates around and enters the annular filter basket 20 where it splits into first and second partial flows. A first part of the filtered flow passes upward through passage 16E, into upper annular filter basket 28, and out filter outlet 50. The remaining second part of the filtered flow swirls around the interior of the annular filter basket 20 from where it passes to the outside of, and through, the right half of filter screen 18 at the right side half chamber, and into the right side half chamber.

As this flow passes through the right half screen, from outside to inside, it flushes previously-trapped particulate material from this part of the screen, and carries the flushed material upward through port 16C and aperture 26A and venturi passage 22A. The fluid traveling upward through the venturi passage 22A will be accelerated due to the narrowing of the venturi passage. This accelerated flow helps entrain and carry the flushed particulate material upward through the venturi passage. The flow then turns downward into the hollow annular collecting cup 34A, and as fluid escapes radially outward through the mesh 34B, the downward flow decreases toward the bottom of the cup releasing the particulate material previously entrained in the flow. The released material, which is trapped by the mesh 34B, descends further and collects at the bottom of the cup 34A for later removal and disposal. The fluid flows radially outward through the mesh 34B and into the upper annular basket 30 where it rejoins the first part of the flow before exiting the filter at outlet 50.

Figure 4A:
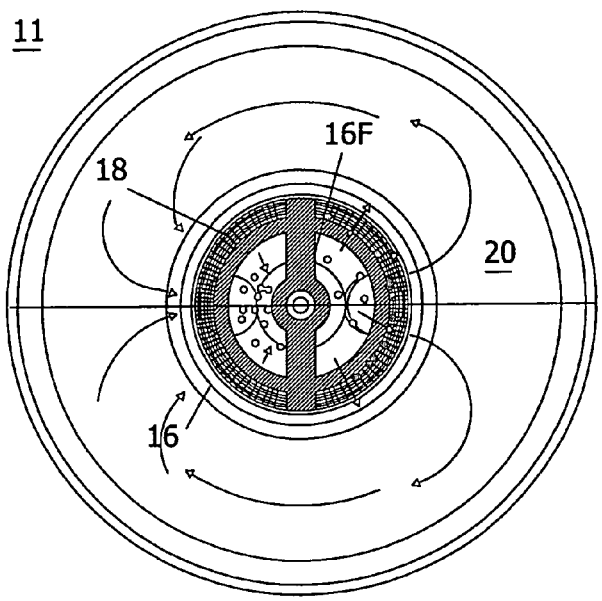
FIG. 4A shows a side view, and above it a cross-sectional plan view as seen at line 3—3 of this side view, these views illustrating fluid flow paths of the filter of FIGS. 1 to 3 when in a second configuration.
Figure 4A:
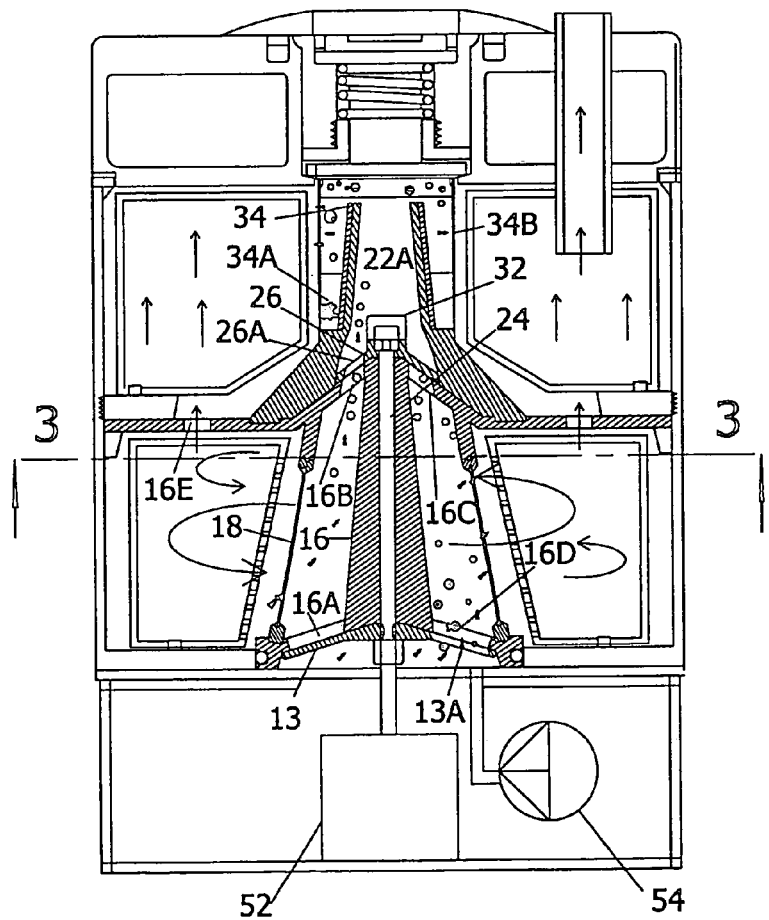
Figure 4B:
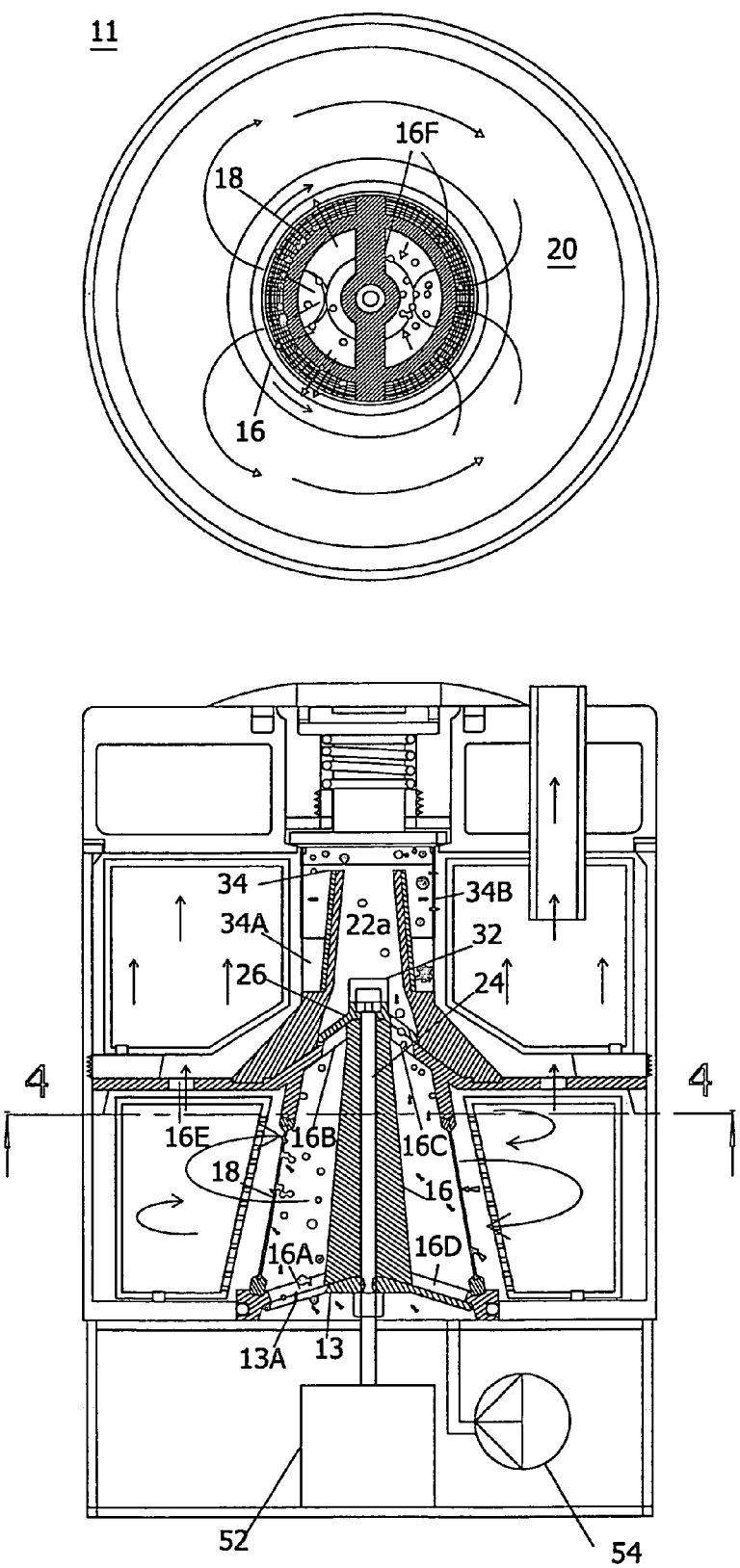
FIG. 4B shows a side view, and above it a cross-sectional plan view as seen at line 4—4 of this side view, these views illustrating fluid flow paths of the filter of FIGS. 1 to 3 when in a first configuration.

The port control discs 13 and 26 are then rotated by 180 degrees, such as by rotary drive motor 52, to bring the filter into the second configuration, as is shown in FIG. 4A. The motor may be driven under control of a timing circuit which controls the rotation interval and/or duration. In this second configuration, aperture 13A in lower port control disc 13 is in alignment with port 16D; ports 16A and 16C are closed; and aperture 26A in the upper port control disc 26 is in alignment with port 16B. In this second configuration the filter inlet fluid from the pump 54 is connected through aperture 13A and port 16D, to the right half chamber seen at the right half of the central filter unit 16.

Particulate material is now trapped on the inside of the right half of screen 18 at the right side half chamber as the fluid flows from the inside to the outside of the filter screen. The filtered fluid then enters annular filter basket 20 where it splits into third and fourth partial flows. The third part of the filtered flow passes upward through passage 16E, into upper annular filter basket 28, and to issue at filter outlet 50. The remaining fourth part swirls around the interior of the annular filter basket 20 from where it passes from the outside of the left half of the filter screen 18 at the left side half chamber, through the screen 18 and into the left side half chamber. As this flow passes from the outside of the screen to the inside, it flushes particulate material trapped during the previous phase from this part of the screen, and carries it upward through port 16B, aperture 26A and venturi passage 22A from where the trapped material, as in the previous phase, falls back down into the hollow annular cup 34A where it is trapped by cartridge mesh 34B mesh for later removal and disposal, while the fluid flows on through the mesh 34B and into the upper annular basket 30 where it rejoins the third part of the flow before exiting the filter at outlet 50.

It will be understood that by the alternate opening and closing of the ports 16A-D as described, water circulates through the filter, and particularly through the media in the lower annular basket 20, with a bi-directional swirling motion.

At occasional intervals, the collecting cup 34A and mesh 34B may be removed from the filter housing as is shown by FIGS. 5A, 5B and 5C. The lock ring 46 is removed from lid 48 after being released by pushing down release knob 44, and turning ring 46 to disengage latch fingers 46A, 46B. The spring 40 will then thrust upward allowing pusher-holder sub-assembly 36 with collector cartridge assembly 34 attached to be removed from around the tapered wall of the venturi passage 22A. The cartridge assembly may then be separated from the disc 36A at the junction between the rim 36B and groove 34C. The collecting cup and mesh may be cleaned, for example by flushing with water to remove the collected particulate material. The collector assembly can then be returned to the filter. Alternatively, the collector cartridge can simply be discarded and replaced with new components.

Figure 12A:
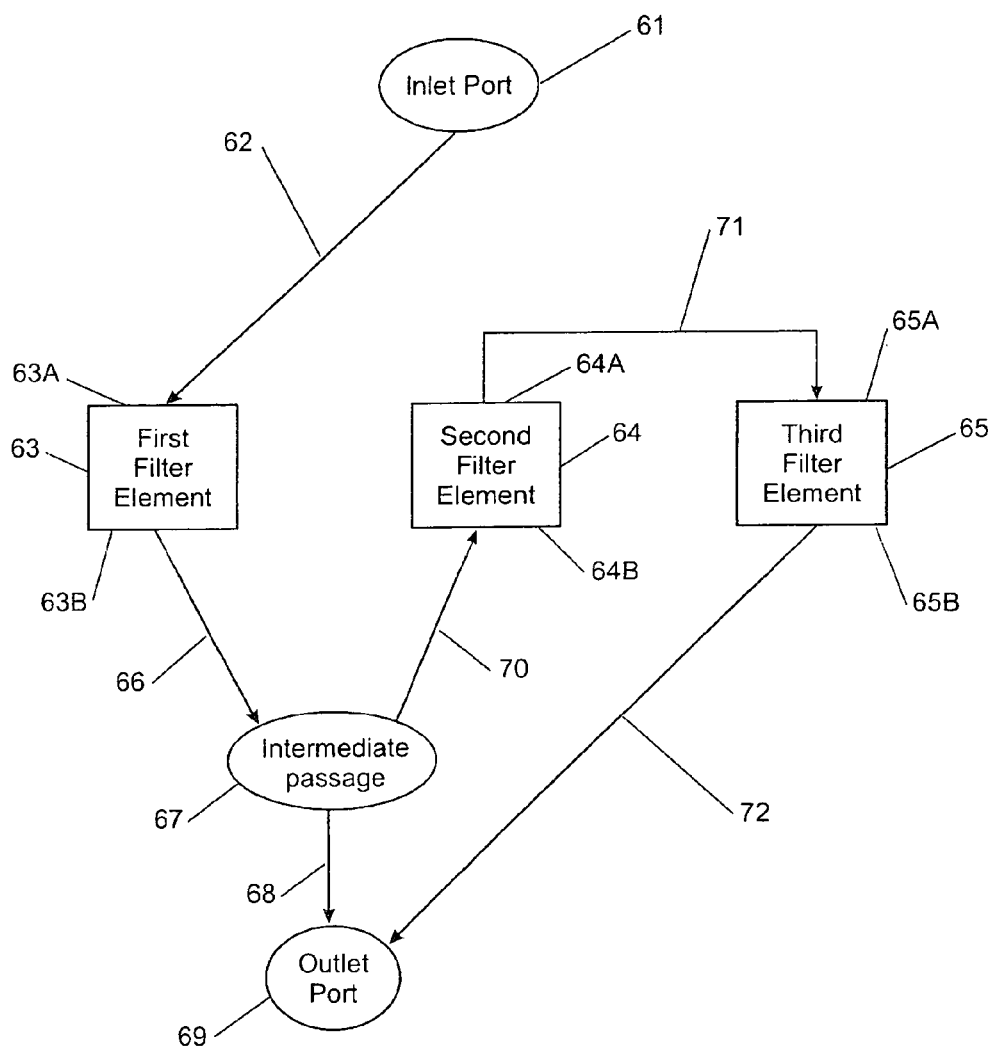
FIG. 12A is a schematic diagram of elements and flow paths of the filter of FIGS. 1 to 4, when in a first configuration.
Figure 12B:
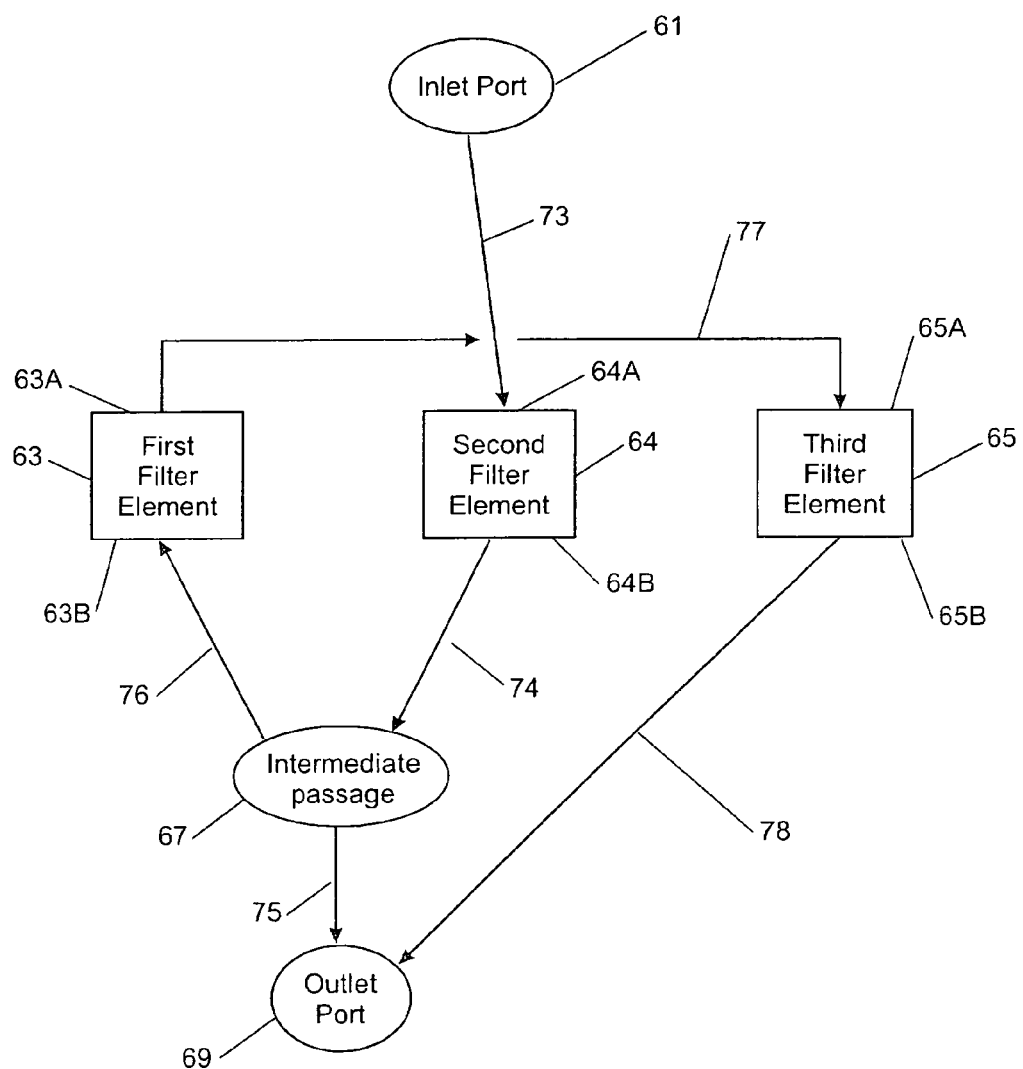
FIG. 12B is a schematic diagram of elements and flow paths of the filter of FIGS. 1 to 4, when in a second configuration.

FIGS. 12A and 12B show the first and second filter configurations in schematic form. In the first configuration, as shown in FIG. 12A, the fluid to be filtered is fed to filter inlet port 61. The inlet port is connected 62 to the first side 63A of a first filter element 63 (for example, the left half of mesh screen 18). Solid particulate material is trapped at the first side 63A of the first filter element 63 while the filtered fluid passes through the first filter element 63 to the second side 63B of the first filter element. The second side 63B is connected 66 to an intermediate passage 67 (for example, the annular space housing lower basket 20) where the flow splits into first and second partial flows of fluid.

The first partial flow is connected 68 to a filter outlet port 69. The second partial flow is connected to the second side 64B of a second filter element 64 (for example, the right half of mesh screen 18). The fluid passes through the second filter element 64 to the first side 64A (of the second filter element) which is connected 71 to the first side 65A of a third filter element 65 (for example, the collecting cup 43A). This flushes solid particulate material, previously trapped at the first side 64A of the second filter element 64 and transfers it to the first side 65A of the third filter element 65.

The fluid of the second partial flows then continues on through to the second side 65B of the third filter element 65 which is connected 72 to the filter outlet port 69.

In the second configuration, as shown in FIG. 12B, the fluid to be filtered is fed to filter inlet port 61. The inlet port is connected 73 to the first side 64A of the second filter element 64 (for example, the right half of mesh screen 18). Solid particulate material is trapped at the first side 64A of the first filter element 64 while the filtered fluid passes through the second filter element 64 to the second side 64B of the second filter element. The second side 64B is connected 74 to an intermediate passage 67 (for example, the annular space housing lower basket 20) where the flow splits into third and fourth partial flows of fluid.

The third partial flow is connected 75 to a filter outlet port 69. The fourth partial flow is connected to the second side 63B of the first filter element 63 (for example, the left half of mesh screen 18). The fluid passes through the first filter element 63 to the first side 63A (of the first filter element) which is connected 77 to the first side 65A of the third filter element 65 (for example, the collecting cup 43A). This fourth partial flow flushes solid particulate material, previously trapped at the first side 63A of the first filter element 63 and transfers it to the first side 65A of the third filter element 65.

The fluid of the second partial flows then continues on through to the second side 65B of the third filter element 65 which is connected 78 to the filter outlet port 69.

Thus particulate solids in the fluid flow are being alternately trapped by one of the first and second filter elements, from where the solids are, in a subsequent phase, flushed and then trapped by the third filter element which is removable for periodic cleaning.

While the filter 11 is operating and is periodically alternated between the two configurations by rotation of the port control discs 13, 26, the full flow of water into the filter is filtered and discharged at the outlet 50. There is no need for a separate source of flushing water and no separate discharge of flushing water, as in the prior art. The flow of filtered water is only interrupted during the occasional removal of the collection cartridge assemblies for cleaning and/or replacement, and then only for a relatively short period.

The foregoing describes the invention including preferred forms thereof. Alterations and modifications as will be obvious to those skilled in the art are intended to be incorporated within the scope of the invention as defined in the accompanying claims. For example, the lower conical port control disc 13 can be substituted with a planar disc, or the disposable cartridge or the filter housing can be rectangular in horizontal cross-sectional shape instead of circularly cylindrical.

It is to be understood that the numerical references included in parentheses in the following claims are given merely as a guide in understanding the correspondence between integers of the claims and the features of the exemplary but non-limiting embodiments shown in the figures. The claims are not intended to be limited to the features or arrangements as shown in the figures.

List of Features Labeled in the Drawings:
11 Filter
12 Filter housing
13 Lower port control disc
13A Aperture
14 Lock bush
15 O-ring seal
16 Central filter unit
16A Inlet port
16B Outlet port
16C Outlet port
16D Inlet port
16F Parietal
16E Passage
17 Guiding pin
18 Mesh screen
20 Lower filter basket
22 Base of collecting cup
22A Venturi passage
24 Shaft
26 Upper port control disc
26A Aperture
28 Upper filter basket
30 Locking ring
32 Locking nut
34 Collector cartridge assembly
34A Hollow collecting cup
34B Cartridge mesh
34C Groove
36 Pusher-holder sub-assembly
36A Chamfered disc
36B Rim
37 Pusher-holder body
38 Locking nut
40 Compression spring
44 Release knob
46 Locking ring
46A Latching finger
46B Latching finger
48 Lid
48A Keyway
50 Filter outlet
52 Motor
54 Pump

What is claimed is:

1. A filter device for filtering a fluid flow, the filter device having a filter chamber having a inlet port for connection to a source of fluid to be filtered and an outlet port for delivery of fluid filtered by the device, the chamber housing first, second and third filter elements each for trapping particulate material while allowing passage of fluid between first and second opposite sides, wherein the second sides of each of the first and second filter elements are connected to an intermediate passage, the second side of the third filter element and the intermediate passage are connected to the outlet port, the filter device has two alternately selectable configurations, and in a first of the configurations the first side of the first filter element is connected to the inlet port and the first side of the second filter element is connected to the first side of the third filter element, and in a second of the configurations the first side of the second filter element is connected to the inlet port and the first side of the first filter element is connected to the first side of the third filter element.

2. A filter device as claimed in claim 1, wherein when the device is in the first configuration fluid from a source connected to the inlet port flows from the inlet port to the first side of the first filter element, through the first filter element to the second side of the first filter element, to the intermediate passage, to split into first and second parallel partial flows, to flow from the intermediate passage via the first partial flow to the outlet port and via the second partial flow to the second side of the second filter element, through the second filter element to the first side of the second filter element, to the first side of the third filter element, through the third filter element to the second side of the third filter element, and to the outlet port, and when the device is in the second configuration fluid from a source connected to the inlet port flows from the inlet port to the first side of the second filter element, through the second filter element to the second side of the second filter element, to the intermediate passage, to split into third and fourth parallel partial flows, to flow from the intermediate passage via the third partial flow to the outlet port and via the fourth partial flow to the second side of the first filter element, through the first filter element to the first side of the first filter element, to the first side of the third filter element, through the third filter element to the second side of the third filter element, and to the outlet port.

3. A filter device as claimed in claim 2, wherein the intermediate passage includes a fourth filter element, and the partial flows pass through the fourth filter element.

4. A filter device as claimed in claim 3, wherein the fourth filter element includes a porous media for filtering fluid flowing through the fourth filter element.

5. A filter device as claimed in claim 3, wherein the fourth filter element has a substantially annular flow passage through which the second and fourth partial flows of fluid move.

6. A filter device as claimed in claim 5, wherein the fourth filter element includes a porous media for filtering fluid flowing through the fourth filter element.

7. A filter device as claimed in claim 1, wherein the filter device includes an outlet filter element for treating fluid received from the intermediate passage and the second side of the third filter element prior to being delivered at the outlet port.

8. A filter device as claimed in claim 7, wherein the outlet filter is a basket containing activated carbon and/or a chemical resin.

9. A filter device as claimed in claim 1, wherein the first filter element has a first port and a second port by which the first side of the first filter element is respectively connectable to the inlet port and to the first side of the third filter element, and the second filter element has third port and a fourth port by which the first side of the second filter element is respectively connectable to the inlet port and to the first side of the third filter element; the first and fourth ports being mutually opened and closed, and the second and third ports being mutually opened and closed synchronously but oppositely to the first and fourth ports, the first and fourth ports being open and the second and third ports being closed when the filter device is in the first configuration, and the first and fourth ports being closed and the second and third ports being opened when the filter device is in the second configuration.

10. A filter device as claimed in claim 9, further including a first disc having a first aperture and a second disc having a second aperture, each of the first and second discs being attached to a common shaft by which the first and second discs can be simultaneously rotated to selectively and alternately align the first aperture with the first and third ports, and the second aperture with the second and fourth ports.

11. A filter device as claimed in claim 1, wherein the filter chamber has a closeable opening through which the third filter element may be removed and replaced.

* * * * *